(12) United States Patent
Evers

(10) Patent No.: US 8,678,887 B2
(45) Date of Patent: Mar. 25, 2014

(54) HOLDING DEVICE FOR SECURING EVISCERATED POULTRY CARCASSES OR PARTS THEREOF

(75) Inventor: Reinhard Evers, Stockelsdorf (DE)

(73) Assignee: Nordischer Maschinenbau Rud. Baader GmbH + Co KG, Lubeck (DE)

( * ) Notice: Subject to any disclaimer, the term of this patent is extended or adjusted under 35 U.S.C. 154(b) by 825 days.

(21) Appl. No.: 12/306,581

(22) PCT Filed: Aug. 15, 2007

(86) PCT No.: PCT/EP2007/007414
§ 371 (c)(1),
(2), (4) Date: Dec. 24, 2008

(87) PCT Pub. No.: WO2008/022787
PCT Pub. Date: Feb. 28, 2008

(65) Prior Publication Data
US 2009/0275275 A1    Nov. 5, 2009

(30) Foreign Application Priority Data

Aug. 25, 2006  (DE) .......................... 10 2006 040 454

(51) Int. Cl.
*A22C 21/00* (2006.01)

(52) U.S. Cl.
USPC .............................. 452/194; 452/185; 452/195

(58) Field of Classification Search
USPC .......... 452/106, 177, 183, 185, 188, 194, 195
See application file for complete search history.

(56) References Cited

U.S. PATENT DOCUMENTS

| | | | | |
|---|---|---|---|---|
| 3,946,461 A * | 3/1976 | Martin | ........................ | 452/165 |
| 4,682,386 A * | 7/1987 | Hazenbroek et al. | ......... | 452/136 |
| 4,780,930 A | 11/1988 | Sparkia | | |
| 4,856,143 A * | 8/1989 | Callsen et al. | ................ | 452/130 |
| 5,045,024 A | 9/1991 | Diesing | | |
| 5,312,291 A * | 5/1994 | van den Nieuwelaar et al. | ............................. | 452/165 |
| 5,697,873 A | 12/1997 | Van Straaten | | |
| 5,833,527 A * | 11/1998 | Hazenbroek et al. | ......... | 452/170 |
| 5,951,393 A * | 9/1999 | Barendregt | .................... | 452/165 |
| 6,579,164 B1* | 6/2003 | Groth | ............................ | 452/125 |
| 6,935,942 B1* | 8/2005 | Evers et al. | .................... | 452/157 |
| 6,986,707 B2* | 1/2006 | Van Den Nieuwelaar et al. | ............................. | 452/187 |

FOREIGN PATENT DOCUMENTS

| | | |
|---|---|---|
| EP | 0 118 963 | 3/1984 |
| EP | 0 401 528 | 5/1990 |
| EP | 1 541 030 | 12/2004 |

* cited by examiner

*Primary Examiner* — David Parsley
(74) *Attorney, Agent, or Firm* — Mattingly & Malur, PC

(57) ABSTRACT

A holder (10) for supporting gutted poultry bodies or parts thereof includes a supporting body (11) for receiving the material to be processed and a clamping apparatus (12) having at least one clamping lever (18) movable against the supporting body (11) for fixing the material to be processed on the supporting body. The clamping apparatus (12) is controllable in such a way that the clamping lever (18) can be moved out of a standby position into a clamping position and vice versa. The holding apparatus (10) is assigned a supporting element (27) which is designed and arranged for supporting parts of the material which protrude beyond the holding apparatus (10) in the direction of transport T of the holding apparatus (10), in the clamping position in such a way that one or more measuring points on the material to be processed are freely accessible to a measuring device.

10 Claims, 5 Drawing Sheets

HOLDING DEVICE FOR SECURING EVISCERATED POULTRY CARCASSES OR PARTS THEREOF

Figure 1:
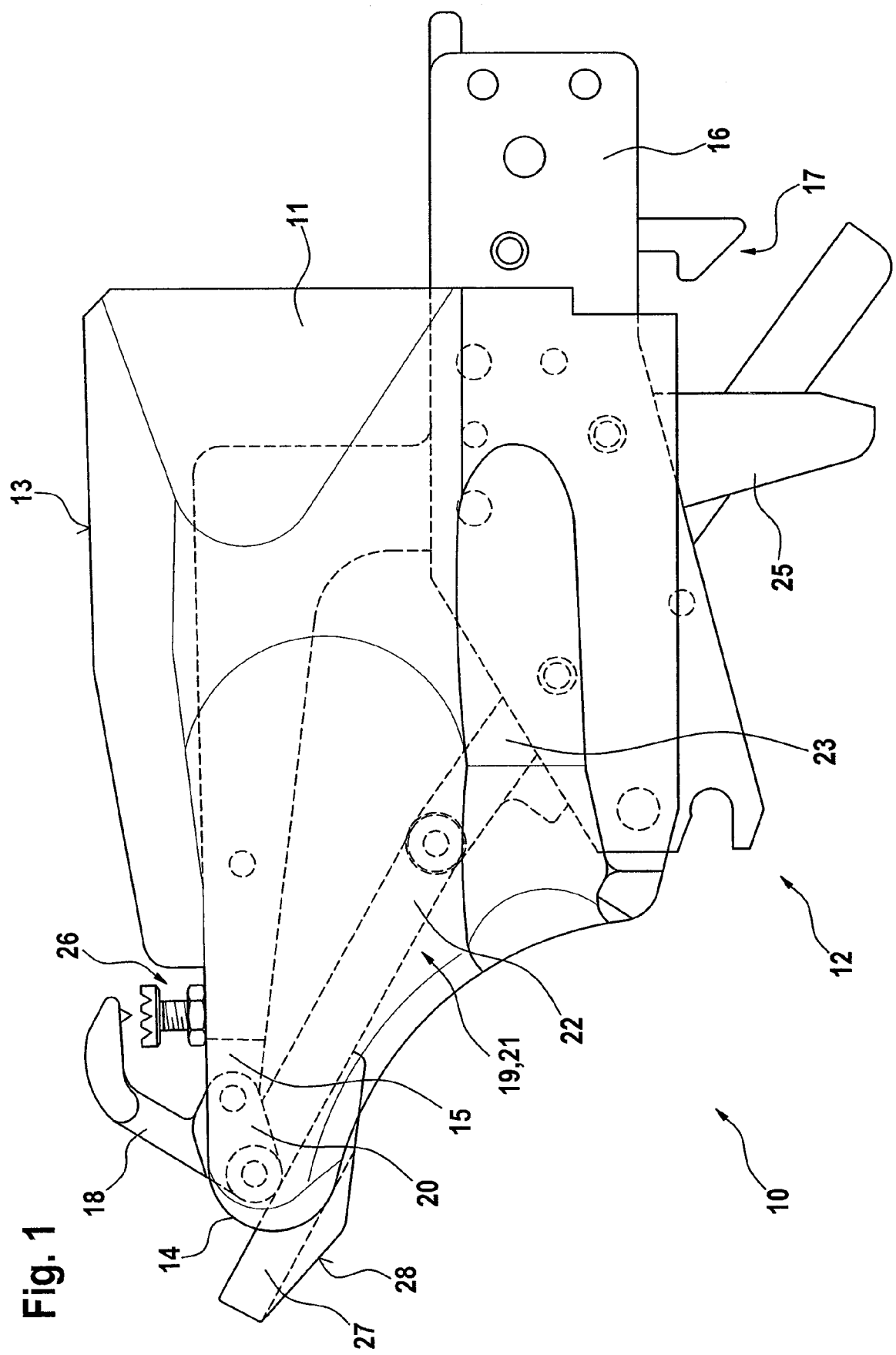

The invention concerns a holding apparatus for supporting gutted poultry bodies or parts thereof as material to be processed during processing thereof, including a supporting body for receiving the material to be processed and a clamping apparatus having at least one clamping lever movable against the supporting body for fixing the material to be processed on the supporting body, the clamping apparatus being controllable in such a way that the clamping lever can be moved out of a standby position into a clamping position and vice versa.

Such holding apparatuses are usually part of a system for processing animal bodies or parts of animal bodies, and are used in particular in poultry processing. Thereby, gutted poultry bodies, parts of poultry bodies such as e.g. front halves or the like are placed as material to be processed in a so-called loading region on an above-mentioned holding apparatus or, to be more precise, on a supporting body of the holding apparatus. Several such holding apparatuses are assigned to a circulating conveyor. By means of the conveyor, the holding apparatuses and hence the material to be processed are transported from one processing station to another. Preferably, one of the processing stations is designed as a measuring station and includes a measuring means which is designed for the detection of specific data (that is, amongst other things size, geometry, position, etc.). The two (shoulder) joints of the poultry body are particularly suitable as measuring points which are directed forwards in the direction of transport of the conveyor and can be detected by two measuring elements, for example.

After loading the holding apparatus with the material to be processed, clamping thereof takes place in order to ensure safe and reliable support during transport and during the processing steps. Clamping is achieved by a clamping apparatus which forms part of the holding apparatus. For this purpose the clamping apparatus has at least one clamping lever movable against the supporting body. In this connection, "against the supporting body" does not necessarily mean that there is direct contact between the clamping lever and the supporting body. Rather, it is important that the clamping lever is movable in the direction of the supporting body in such a way that the material to be processed, by the example of a chicken the breastbone thereof, is clamped and therefore fixed between the clamping lever and the supporting body.

From the applicant's EP 0 401 528 B1 for example is known a holding apparatus having the above-mentioned generic features and the described manner of operation. In practical use of holding apparatuses of this kind, however, particularly when processing front halves of poultry bodies with or without wings it has turned out that parts of the poultry body, usually the neck of the poultry or parts of the neck and possibly cervical vertebral column parts lie in the region of the (shoulder) joints of the poultry body which serve as measuring points. To be more precise, the neck hangs laterally in front of the joints and/or is so wide that the neck or neck parts lie precisely in the region in which the measuring elements are to encounter/touch the (shoulder) joints. If the holding apparatus with the poultry body then strikes the corresponding measuring means, for example two measuring elements which can lie parallel and adjacent to each other or offset from each other in the direction of transport, at first contact the measuring elements detect the neck and not the actual measuring points, namely the joints. Due to the fact that the neck or neck parts form the measuring point, a false picture of the material to be processed is formed. To put it another way, the measuring data are falsified, so that subsequent processing tools, for example circular blades or the like, are controlled on the basis of false measuring data, which in turn leads to incorrect cutting. As a result, the end products are of lower quality and the yield is reduced.

It is therefore the object of the present invention to provide a holding apparatus which is easy to handle and which allows improved measurement of the joints of the material to be processed.

This object is achieved by a holding apparatus having the features mentioned hereinbefore in such a way that the holding apparatus is assigned a supporting element which is designed and arranged for supporting parts of the material which protrude beyond the holding apparatus in the direction of transport T of the holding apparatus, in the clamping position in such a way that one or more measuring points on the material to be processed are freely accessible to a measuring means. Thus in a simple and reliable manner it is ensured that all parts, in particular also the neck or neck remains of the poultry body, are kept away from the region of the joints, so that measuring elements can without exception be applied to the joints. In other words, the neck or parts thereof are lifted or held in the lifted position so high that the neck or parts thereof can no longer touch the measuring means. The (shoulder) joints encounter the measuring means unhindered, so that precise measurement takes place. As a result, uniform cutting results are obtained. Furthermore, the proportion of bone in the end product is reduced and the yield is increased.

Preferably, the supporting element is functionally connected to the actuating mechanism for the or each clamping lever. Thus it can be effectively ensured that operation of the clamping lever on the one hand and the supporting element on the other hand can be carried out in synchronisation in a particularly simple manner.

In an appropriate development of the invention, the supporting element is attached to the actuating mechanism for the clamping lever in the region of the clamping lever. Hence firstly handling is made easier and secondly reliable operation is ensured due to the mechanical coupling of clamping lever and supporting element.

Advantageously, the supporting element is arranged and designed in such a way that in the standby position it lies within the holding apparatus and in the clamping position it lies outside the holding apparatus, so that in the clamping position it forms an extension of the control rod protruding beyond the holding apparatus. Thus loading can be accomplished particularly easily due to the retracted standby position. Furthermore, the position of the supporting element protruding beyond the holding apparatus in the clamping position forms an ideal bearing surface for parts of the material to be processed which protrude beyond the holding apparatus.

Particularly appropriate is an embodiment in which the bearing surface facing towards the material protruding beyond the holding apparatus is completely flat. This guarantees particularly reliable support of the material to be processed, in particular the neck or the like.

Figure 2:
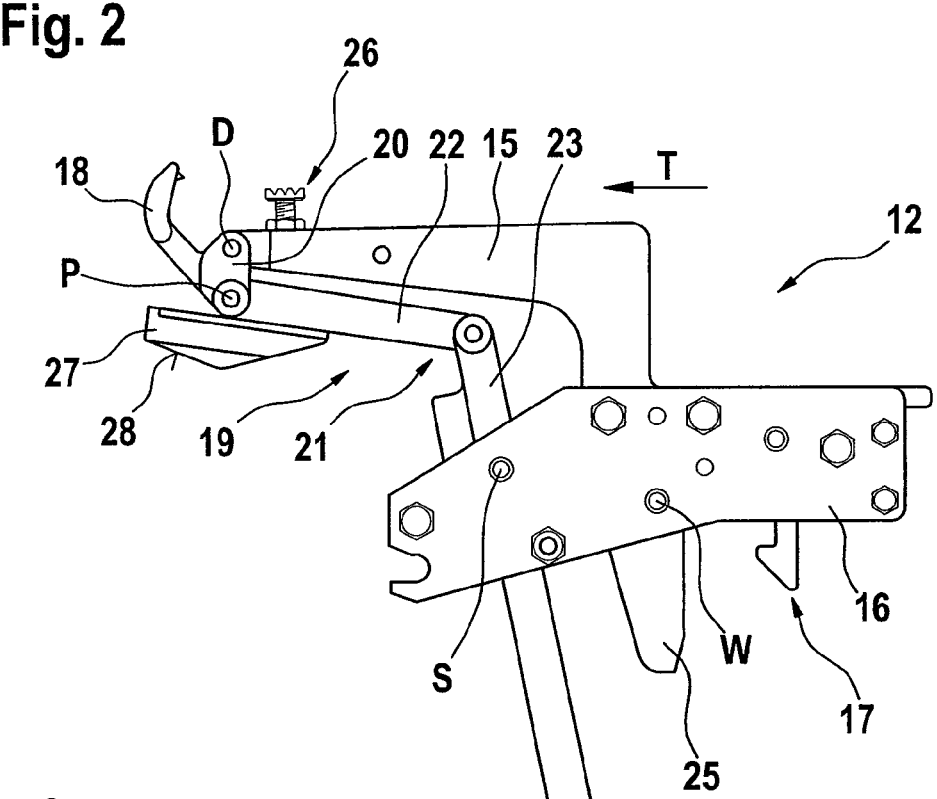
Figure 3:
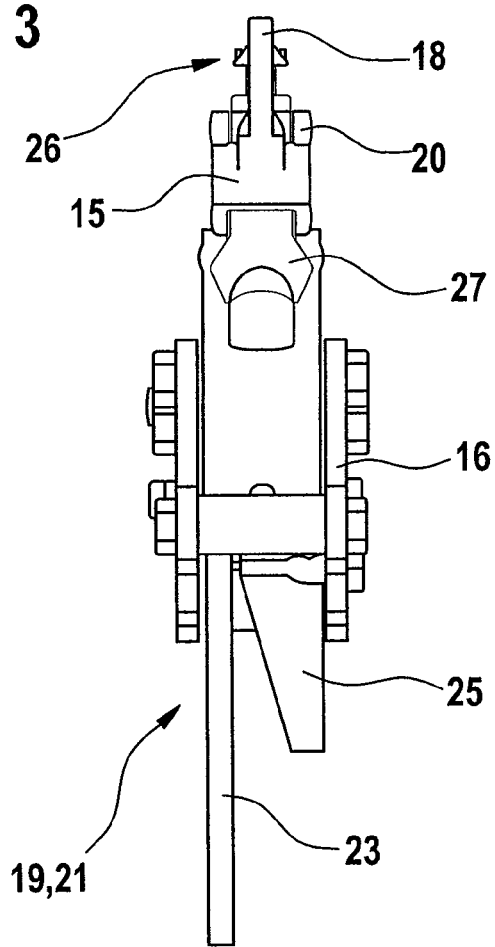
Figure 4:
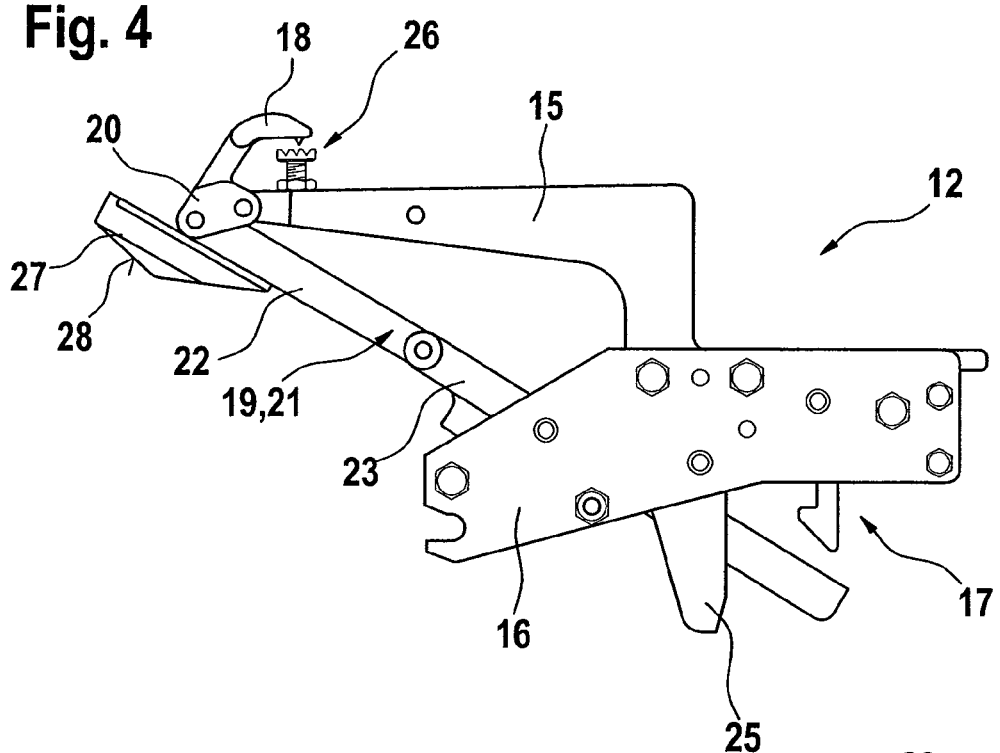
Figure 5:
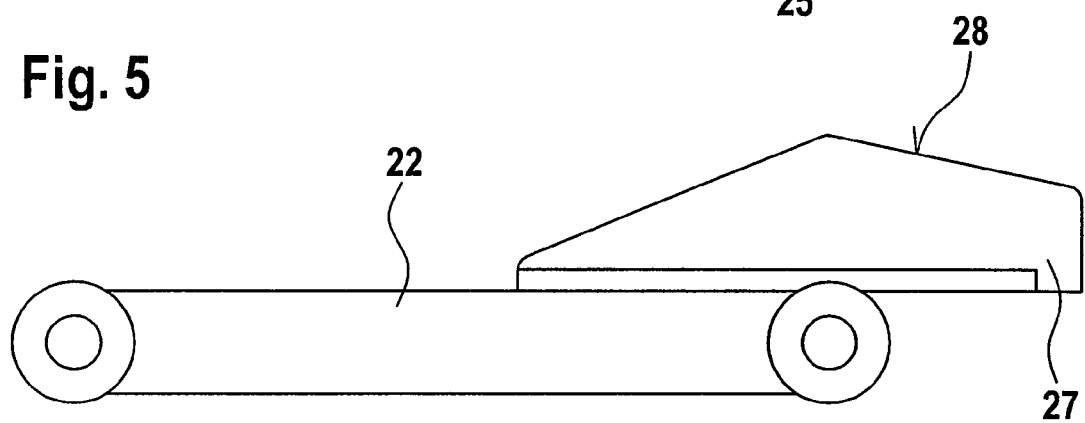
Figure 6:
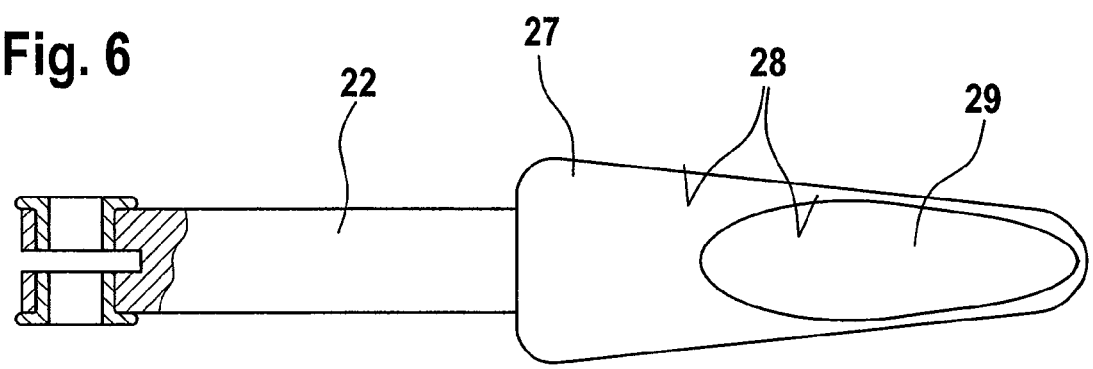
Figure 7:
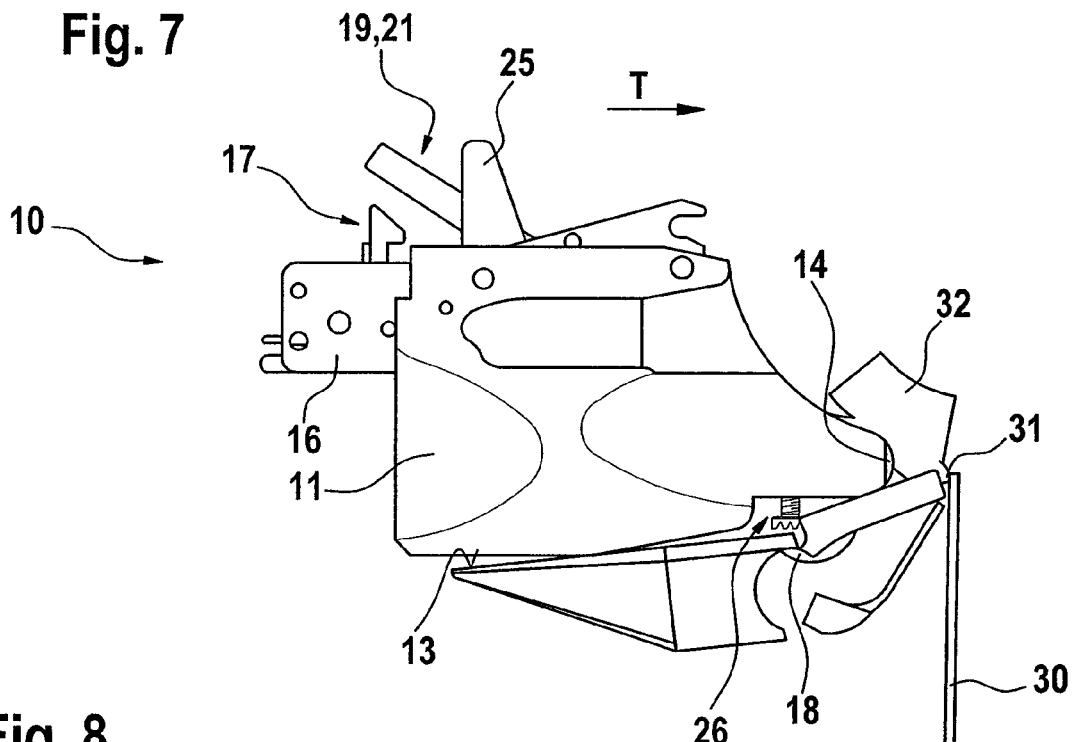
Figure 8:
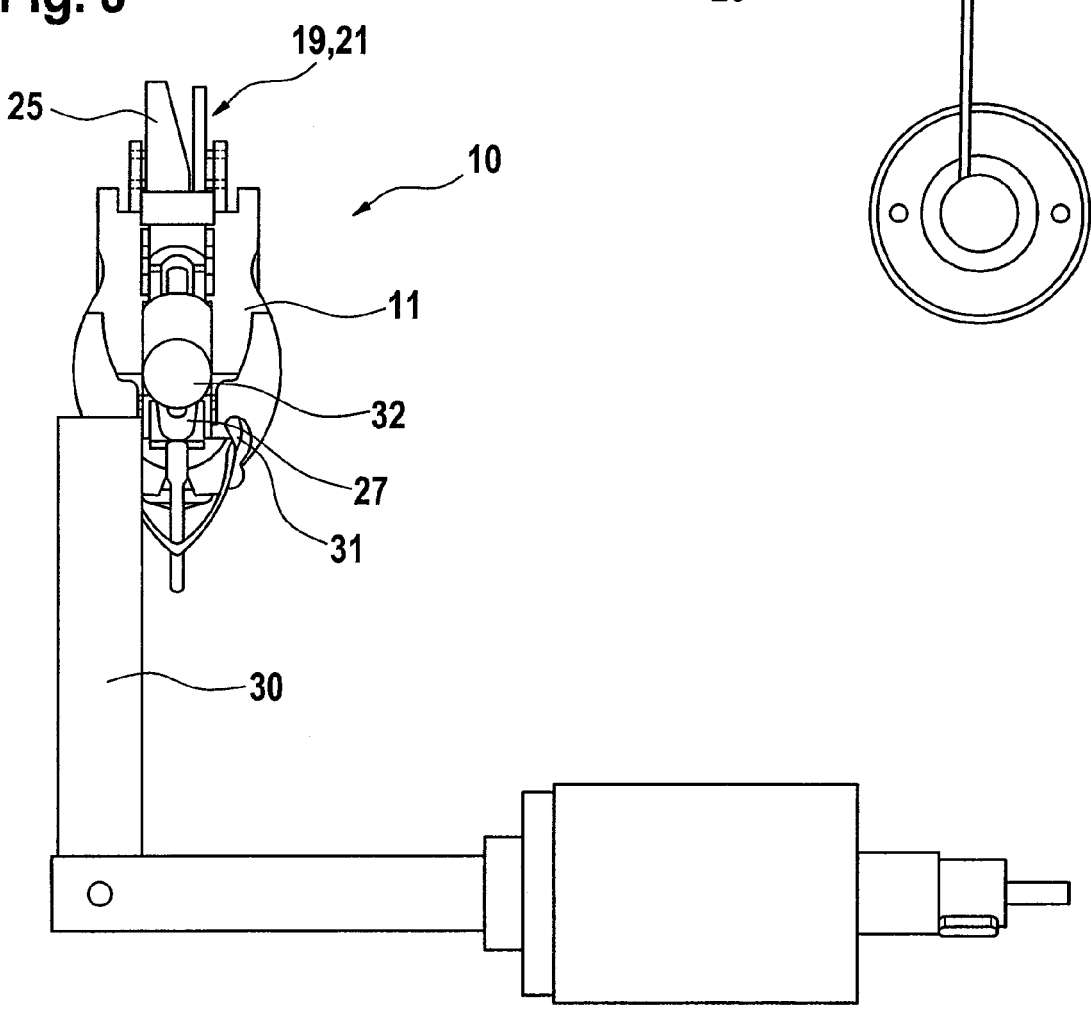
Figure 9:
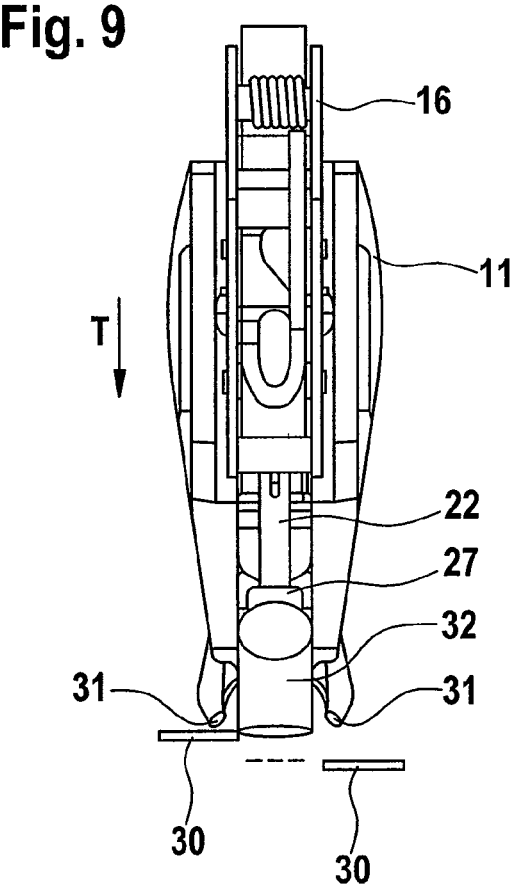
Figure 10:
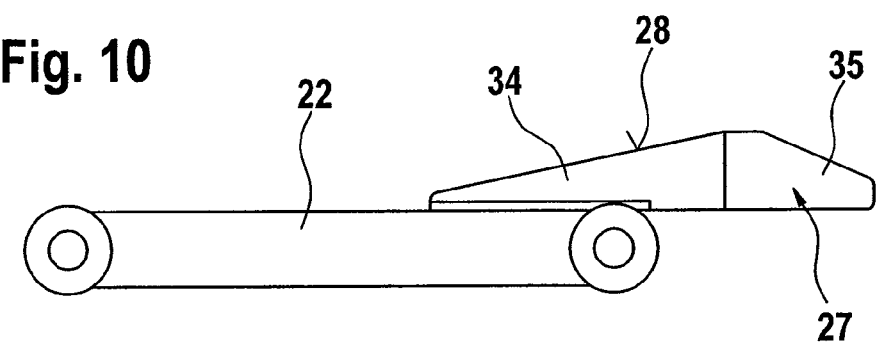
Figure 11:
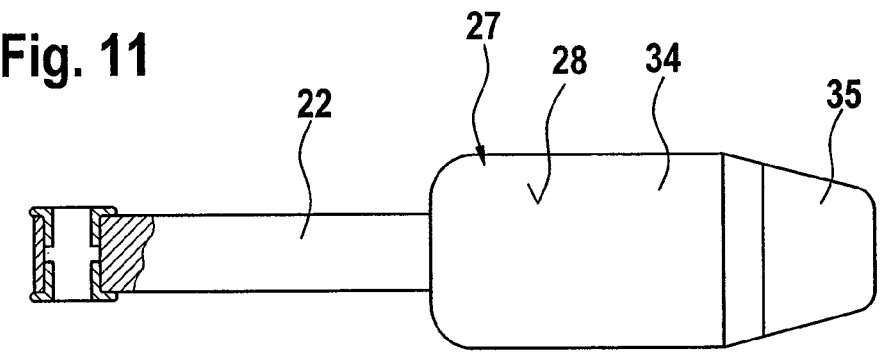

Further appropriate or advantageous features and embodiments are apparent from the subsidiary claims and the description. A particularly preferred embodiment is described in more detail with the aid of the attached drawings. The drawings show:

FIG. 1 a side view of a holding apparatus in the clamping position without the material to be processed, FIG. 2 a side view of the clamping apparatus of the holding apparatus according to FIG. 1 in the standby position, FIG. 3 a front view of the clamping apparatus according to FIG. 2, FIG. 4 a side view of the clamping apparatus of the holding apparatus according to FIG. 1 in the clamping position, FIG. 5 a side view of the supporting element attached to an actuating element for the clamping lever, FIG. 6 a top view of the supporting element according to FIG. 5, FIG. 7 a side view of the holding apparatus according to FIG. 1 in an upside-down position with parts of a poultry skeleton and a measuring means abutting against shoulder joints, FIG. 8 a front view of the holding apparatus according to FIG. 7, FIG. 9 a view from above of the holding apparatus according to and in the position of FIG. 7, FIG. 10 a side view of a further embodiment of the supporting element, and FIG. 11 a top view of the supporting element according to FIG. 10.

The holding apparatuses shown in the figures serve to hold gutted poultry bodies or parts thereof, whereby the holding of other materials to be processed with comparable qualities and dimensions is also essentially possible.

The holding apparatus 10 shown in FIG. 1, which in basic principle is also described in great detail in the applicant's EP 0 401 528 B1 and to the description of which reference is made at this point, includes a supporting body 11 and a clamping apparatus 12. The supporting body 11 and the clamping apparatus 12 form a unit, the supporting body 11 being releasably connected to the clamping apparatus 12 particularly for hygienic reasons or requirements.

The supporting body 11 itself is preferably made from a synthetic material. Other materials permitted in food processing can be used as well. The supporting body 11 is saddle-shaped and designed with a supporting surface 13 for supporting the material to be processed and a saddle horn 14 pointing forwards in the direction of transport T. On the side facing towards the clamping apparatus 12, the supporting body 11 is substantially U-shaped for receiving the clamping apparatus 12.

In the described embodiment, the clamping apparatus 12 is formed from a corrosion-resistant metal. Other materials which have corresponding properties, in particular with respect to corrosion resistance and suitability for the food industry are possible as well. The clamping apparatus 12 includes a carrying element 15 on which the supporting body 11 is placed. The carrying element 15 is in turn attached to a connecting element 16. The connecting element 16 serves firstly to support the carrying element 15 and secondly to connect the holding apparatus 10 to a not-shown conveying element. For this purpose the connecting element 16 has ordinary quick-acting closure elements 17 such as e.g. a bayonet fastening. Furthermore, a clamping lever 18 with an actuating mechanism 19 forms part of the clamping apparatus 12.

The clamping lever 18 is attached in the region of the saddle horn 14 of the supporting body 11 to the carrying element 15 so as to be pivotable about an axis D. Here, the clamping lever 18 and possibly several clamping levers are arranged on a crank lever 20. In other words, the crank lever 20 on which at least one clamping lever 18 is arranged or which is formed in one piece with the crank lever 20 is designed or arranged to be pivotable about the axis D. The crank lever 20 and hence also the or each clamping lever 18 is functionally connected to the actuating mechanism 19. To be more precise, the actuating mechanism 19 in the shown embodiment is a toggle mechanism 21.

The toggle mechanism 21 has a control rod 22 which at one end is hinged to the crank lever 20 and at the other end is hinged to an actuating lever 23. The at least partly double-armed actuating lever 23 is mounted on the connecting element 16 so as to be pivotable in the region of an axis S and with the end opposite the control rod 22 protrudes downwards out of the connecting element 16. The hinge joints between the crank lever 20 and the control rod 22 on the one hand and between the control rod 22 and the actuating lever 23 on the other hand are designed and arranged relative to the axis S of the actuating lever 23 on the connecting element 16 in such a way that in the clamping position of the clamping lever 18 they easily surpass an extended position in which the above-mentioned hinge joints lie in a straight connecting line. In this case a spring element 24 which at one end is arranged on the connecting element 16 and with the other end is attached to the connecting point between the control rod 22 and the actuating lever 23 secures both the clamping position and a standby position in which the clamping apparatus 12 is in the open position.

In addition, associated with the connecting element 16 is an angle lever 25 which with one free end can be functionally connected to the actuating lever 23 and with the other free end protrudes downwards out of the connecting element 16. The angle lever 25 is arranged so as to be pivotable about an axis W on the connecting element 16. In the region of the carrying element 15, or to be more precise on the supporting surface 13 thereof, is optionally provided a stop element 26. The stop element 26 can be a stationary bolt, but also an element which can be pressed into the carrying element 15 against a spring element, not shown. In other words, a clamping action of the material to be processed can be produced either between the clamping lever 18 and the carrying element 15 or between the clamping lever 18 and the stop element 26. Also, a clamping action between the clamping lever 18 and the supporting body 11 is possible. In this case the clamping lever 18 in the clamping position can be directly in contact with an abutment, that is, the carrying element 15 or the stop element 26 or the supporting body 11, or at a distance from the abutment.

Further associated with the holding apparatus 10 is a supporting element 27. The supporting element 27 is a shoe-like element which is arranged in the region of the clamping lever 18. To be more precise, the supporting element 27 is arranged on and attached to the control rod 22 of the toggle mechanism 21. In this case the supporting element 27 protrudes in the direction of transport T beyond the control rod 22 (see in particular FIGS. 2, 4 and 5). To put it another way, the supporting element 27 forms a kind of extension of the control rod 22 beyond the hinge point P between control rod 22 and crank lever 20. The width of the supporting element 27 is selected or designed so as to be narrower than the shortest distance between two measuring points which are defined by the shoulder joints of the material to be processed. Preferably, however, the width of the supporting element 27 is at the most as wide as permitted by the distance between the measuring points. The width of the supporting element 27 can also be limited by the distance between the two spaced-apart sides of the saddle horn 14. With respect to the measuring means described below, the width of the supporting element 27 is smaller than the shortest distance between two measuring elements of the measuring means, or as wide as the distance between the measuring elements permits.

The supporting element 27 has a bearing surface 28 which is located on the side of the supporting element 27 facing away from the control rod 22. This bearing surface 28 for parts of the material protruding in the direction of transport T beyond the holding apparatus 10 or, to be more precise, beyond the saddle horn 14 of the supporting body 11, that is, in particular for a neck section and/or cervical vertebral column sections of a chicken, may optionally comprise a guide 29 which guarantees exact holding/support of the neck section/cervical vertebral column sections. Preferably, however, the bearing surface 28 facing towards the material to be processed, that is, e.g. the neck is completely flat (see e.g. FIGS. 10 and 11). In the embodiment shown in FIGS. 10 and 11, the supporting element 27 is approximately triangular in a side view. The bearing surface 28 in the clamping position is preferably formed by the longer arm 34 of the supporting element 27. The shorter arm 35 usually serves as an auxiliary element when loading the material to be processed onto the holding apparatus 10. The shape of the supporting element 27 may however also vary and be rectangular, polygonal or otherwise in a side view.

The supporting element 27 in the standby position of the clamping lever 18 is in a lower, retracted position such as to lie preferably behind the clamping lever 18 which is in the standby position, in the direction of transport T (see FIG. 2), or to lie flush with it. But naturally the supporting element 27 can also protrude beyond the clamping lever 18 in the direction of transport T. If the clamping lever 18 is moved out of the standby position (see FIG. 2), which corresponds to the holding or loading position for the holding apparatus 10, into the clamping position (see FIG. 4), due to the functional connection to the toggle mechanism 21 and, more precisely, to the control rod 22, the supporting element 27 moves forwards and upwards in the direction of transport T, so that in the clamping position of the clamping lever 18 it protrudes beyond the holding apparatus 10 and, to be more precise, relative to the foremost part of the holding apparatus 10 in the direction of transport T, namely the crank lever 20.

The supporting element 27 thus forms a support for parts of the material to be processed which protrude beyond the holding apparatus 10 in the direction of transport T of the holding apparatus 10, in the clamping position. For this purpose the supporting element 27 is designed and arranged in such a way that one or more measuring points on the material to be processed are freely accessible to a measuring means. For a greater understanding FIGS. 7 to 9 again show the holding apparatus 10 with selected (not complete) parts of the skeleton of a chicken. In FIGS. 7 and 8 the holding apparatus 10 is shown in the upside-down position, as the conveying element (not shown) to which the holding apparatuses 10 are releasably attached is endlessly circulating. In the region of a lower run of the conveying element is arranged the measuring means towards which the material to be processed is conveyed. In the example described, the measuring means includes two measuring elements 30, of which one measuring element 30 is shown. The measuring elements 30 can lie adjacent to each other or, as preferred (see e.g. FIG. 9), offset from each other in the direction of transport T. The material to be processed is moved towards the measuring elements 30 by conveying the holding apparatus 10 in the direction of transport T, the material encountering the measuring elements 30 with its (shoulder) joints 31. The neck 32 or neck portions and/or cervical vertebral column portions rest on the supporting element 27 during the recording of measured values. In other words, the supporting element 27 ensures that at least during measurement the neck 32 is lifted and lies outside the region of the shoulder joints 31, so that the measuring points, that is, the shoulder joints 31 are freely accessible to the measuring elements 30.

The invention claimed is:

1. Holding apparatus for supporting gutted poultry bodies or parts thereof as material to be processed during processing thereof, including a supporting body for receiving the material to be processed and a clamping apparatus having at least one clamping lever movable by an actuating mechanism against the supporting body for fixing the material to be processed on the supporting body, the clamping apparatus being controllable in such a way that the clamping lever can be moved out of a standby position into a clamping position and vice versa, wherein,
the holding apparatus includes a supporting element connected on the actuating mechanism which extends beyond a forward end of the holding apparatus in the direction of transport for supporting parts of the material which protrude beyond the holding apparatus in the direction of transport of the holding apparatus, in the clamping position in such a way that one or more measuring points on the material to be processed are freely accessible to a measuring means.

2. Holding apparatus according to claim 1, wherein, the supporting element is designed and arranged on the holding apparatus in such a way that shoulder joints of a poultry body are freely accessible to two measuring elements of the measuring means.

3. Holding apparatus according to claim 1, wherein, the supporting element is connected on to the actuating mechanism for the clamping lever in the region of the clamping lever.

4. Holding apparatus according to claim 1, wherein, the actuating mechanism is a toggle mechanism which comprises a control rod and an actuating lever.

5. Holding apparatus according to claim 4, wherein, the supporting element is arranged on the control rod.

6. Holding apparatus according to claim 4, wherein, the supporting element is arranged and designed in such a way that in the standby position it lies within the holding apparatus and in the clamping position it lies outside the holding apparatus, so that in the clamping position it forms an extension of the control rod protruding beyond the holding apparatus.

7. Holding apparatus according to claim 1, wherein, the width of the supporting element is equal to or smaller than the shortest distance between two measuring elements of the measuring means.

8. Holding apparatus according to claim 4, wherein, the supporting element on the side opposite the control rod forms a bearing surface for the neck/neck portions/cervical vertebral column portions.

9. Holding apparatus according to claim 8, wherein, the bearing surface facing towards the material protruding beyond the holding apparatus is completely flat.

10. Holding apparatus according to claim 8, wherein, the bearing surface comprises a guide.

* * * * *